United States Patent [19]

Hennessy

[11] 4,227,313
[45] Oct. 14, 1980

[54] COMPASSES

[76] Inventor: John B. Hennessy, Ahuroa, North Auckland, New Zealand

[21] Appl. No.: 896,014

[22] Filed: Apr. 12, 1978

[30] Foreign Application Priority Data

Apr. 14, 1977 [NZ] New Zealand .................. 183868

[51] Int. Cl.³ ................. G01C 17/08; G01C 17/18
[52] U.S. Cl. ................................. 33/364; 33/355 R
[58] Field of Search ............... 33/355, 364, 356, 357, 33/358

[56] References Cited

U.S. PATENT DOCUMENTS

| 1,306,882 | 6/1919 | Clarke | 33/355 |
|---|---|---|---|
| 1,533,683 | 4/1925 | Abbot | 33/355 |
| 2,177,218 | 10/1939 | Klein et al. | 33/364 |
| 2,300,710 | 11/1942 | Sperry | 33/364 |
| 2,446,258 | 8/1948 | Burt | 33/355 D |
| 2,803,068 | 8/1957 | Mason | 33/364 |
| 3,349,406 | 10/1967 | Perry et al. | 33/364 |
| 3,374,549 | 3/1968 | Hanson | 33/364 |
| 3,568,328 | 3/1971 | Sharpe | 33/355 |
| 3,927,474 | 12/1975 | Lapeyre | 33/356 |
| 4,004,348 | 1/1977 | Fowler et al. | 33/364 |

Primary Examiner—John W. Shepperd
Attorney, Agent, or Firm—Wenderoth, Lind & Ponack

[57] ABSTRACT

A compass includes a chamber, a card, needle or the like together with suspension means which suspend the card, needle or the like within the chamber. Magnet mounting means are engaged with the card, needle or the like and a magnet is engaged with the magnet mounting means in such a manner that in use the magnet may rotate at least in a plane normal to the plane containing the card, needle or the like, and such movement does not cause any substantial movement of the card, needle or the like.

8 Claims, 5 Drawing Figures

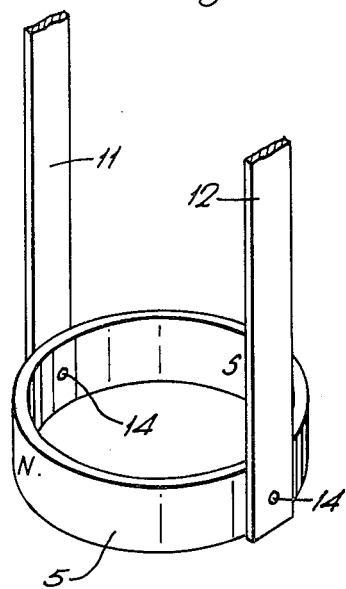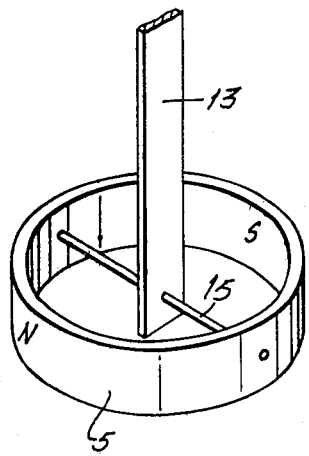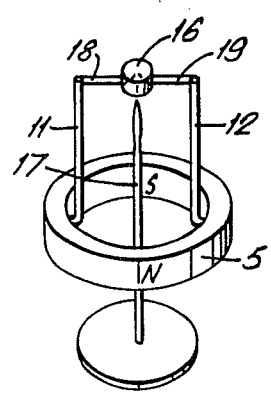

COMPASSES

SUMMARY OF THE INVENTION

This invention relates to compasses.

It is therefore an object of the present invention to provide a compass which will at least provide the public with a useful choice.

Accordingly the invention includes in a compass comprising a chamber, a card, needle or the like, suspension means suspending or floating the card, needle or the like within the chamber, a magnet mounting means engaged with the card, needle or the like, a magnet engaged with the magnet mounting means in a manner such that in use the magnet may rotate at least in a plane normal to the plane containing the card, needle or the like, such movement not causing any substantial movement of the card, needle or the like.

To those skilled in the art to which this invention relates, many changes in construction and widely differing embodiments and application of the invention will suggest themselves without departing from the scope of the invention as defined in the appended claims. The disclosures and the description herein are purely illustrative and are not intended to be in any sense limiting.

BRIEF DESCRIPTION OF THE DRAWINGS

One preferred form of the invention will now be described with reference to the accompanying drawings in which, FIGS. 3, 4 & 5 are perspective diagrammatic views of two forms of magnet mounting arrangements for use in compasses according to the invention.

DETAILED DESCRIPTION OF THE INVENTION

Figure 1:
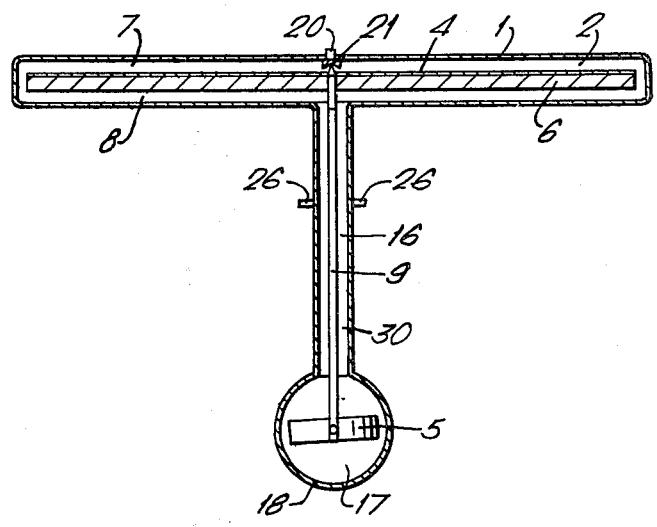
FIGS. 1 & 2 are cross sectional views of two alternative assembly embodiments of a compass according to the invention.

In the preferred form of the invention a compass is provided which comprises, referring to FIG. 1, walls 1 defining a chamber 2. The chamber has a card, needle or the like (hereinafter card) 4 floated or suspended therein and a magnet 5 is engaged with the card and the magnet is suspended in use such that the magnet may pivot in a plane normal to the plane containing the card 4. Such pivotal movement of the magnet does not cause any substantial movement of the card 4.

The card 4 is preferably mounted on a float 6 as will be described further later. The chamber 2 preferably comprises a dish or cylinder, the dimensions of which, particularly in the direction normal to the plane containing the card 4 allows a relatively small clearance between the walls of the chamber and the float 6, a small clearance is provided at positions 7 and 8 for example. The exact dimensions of such clearance will depend substantially on the size of the compass being produced but as a general guide a card tilt of about 50° in either direction should be able to be accommodated.

A magnet mounting means is provided to mount the magnet 5 on the card 4 and the magnet 5 is preferably pivotally mounted on the mounting means.

A suspension means is provided to suspend the card 4 within the chamber 2.

The magnet mounting means may comprise rods such as rods 9 or 10 which vary in effect only in their lengths and the rods 9 or 10 may comprise a pair of substantially parallel rods 11 and 12 referring to FIG. 3 or a single rod or tube such as rod 13 referring to FIG. 4.

In each case, the magnet 5 is engaged with the rods and in the construction shown in FIG. 3 pins 14 may be passed through aligned apertures in the rods 11 and 12 and opposite points on the magnet 5 and fixed in any desired manner. The rods may comprise a single rod such as rod 15 shown in FIG. 4 which is affixed at its ends to opposite sides of the magnet 5 and which passes through an aperture in the rod 13. The construction enables the magnet 5 to pivot in a vertical plane.

The magnet 5 is polarised such that a pair of opposite points are polarised north and south. The pivot points between the ring or circle magnet 5 and the mounting arm 9 or 10 for example, are preferably mid-way between the north and south poles of the magnet.

An extension is provided to the chamber 2 and referring to FIG. 1 the extension comprises a hollow extension such as a tube 16 having a chamber 17 at the lower end thereof and the connecting rod 9 passes downwardly through the tube 16 into the chamber 17 so that the magnet 5 is positioned within the chamber 17. A bearing may be provided in the tube 16 such as teflon bearing 30.

The chamber 17 is preferably an expansion chamber which may comprise a rubber or rubber like or other expandable material 18 formed for example, to the shape shown in FIG. 1. Alternatively, part of the chamber may be so formed.

In the construction in FIG. 2 again the chamber 19 preferably comprises an expansion chamber and may be formed as above but the chamber formed by the walls 19 may be affixed directly, in effect, to the underside of the chamber 2 or the extension may be relatively short.

Figure 2:
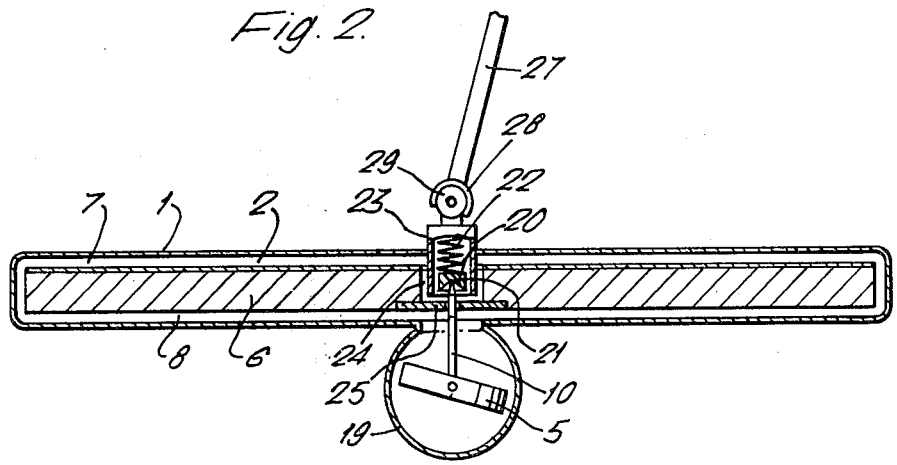

The card 4 is suspended within the chamber 2 and FIGS. 1 and 2 show two methods of achieving this suspension. Referring to FIG. 1 a bearing 20 is provided having a cup underside preferably of substantially "V" cross section and on the upper side of the float 6 is a point member 21 which engages in the cup of the bearing 20.

The weight of the elements and also the buoyancy of the float 6 are selected such that there will be a general upward pressure of the point member 21 into the bearing 20 but they are preferably selected such that this pressure is not too great so as to reduce the wear on the point 21 and the bearing 20 or downward pressure in alternative suspension.

In the construction in FIG. 2 the bearing 20 is spring/rubber loaded by a spring 22 contained in a housing 23 passing through an aperture in the upper surface of the walls 1.

The point member 21 is formed by an extension of the rod 10 which passes upwardly through a central aperture 24 in the float 6. The central aperture may be closed by a plate 25 in which the rod 10 is fixed so that the point member 21 may bear on the bearing 20.

Again the weight and buoyancy of the component is selected to allow a relatively low force to be exerted on the bearing 20 by the point member 21.

The chamber 2 is filled with a suitable fluid such as for example, methyl alcohol and water or isopropyl alcohol or glycerine and water or a low viscosity oil.

The structure so formed is then suspended in a holding frame (not shown) and referring to FIG. 1 gimbal pivots 26 may be provided which engage on a suitable receiving frame part and in the construction of FIG. 2 the compass may be suspended from above, for example, by an arm 27 having a cup or socket 28 at the lower end thereof which may engage about a ball 29 extending from the chamber walls 1. Of course, the socket and ball may be positioned on the compass and arm respectively or other suspension methods may be used as required.

The walls of the chamber 1 are preferably transparent on the top, bottom and side surfaces or on any of these and the card may be printed on the top, bottom and edges of the float 6 and in fact it will be apparent that the card and float may comprise the same integer. It will also be apparent that other methods of suspending the float within the chamber may be used such as underneath suspension but this is less desirable.

In the construction shown in FIG. 1 in particular, the weights of the elements are selected such that the centre of gravity is below the gimbal pivots 26.

Because the centre of gravity of the construction is below the gimbal pivots 26 the construction will remain substantially in a horizontal plane in use. In the construction of FIG. 2 again the centre of gravity is kept as low as possible by selection of the weight of the components.

Referring to FIG. 5 the magnet 5 is suspended by a pair of rods 11 and 12 extending from a bearing 16. The bearing 16 rests on a pivot formed by needle 17. The arms 18 and 19 forming part of the arms 11 and 12 provide, for example, a mounting point for the card or float. In order to provide a pivot between the arms 11 and 12 and the magnet 5 the ends of the arms 11 and 12 may be outturned and brought to points which point engage in suitable depressions on the inner surface of the magnet 5. The use of the invention is as follows:

With the chamber mounted within a suitable frame if desired, as the compass is used and the angle of dip changes, the magnet may pivot on the connecting rod in a manner such that as the magnet pivots there is no corresponding, tilting of the card or needle, and thus the card remains substantially horizontal irrespective of the angle of dip. Although the construction has been described with the magnet displaced some distance from the card it will be apparent that other constructions are possible and the magnet, for example, may be pivotally connected within the card.

Thus it can be seen that at least in the preferred form of the invention a compass is provided which enables the compass to be used in virtually any position on the earth's surface irrespective of the angle of dip up to 85° but it is believed that the compass will be most effective where the angle of dip is less than 80°. A stop can be provided to limit rotation of the magnet to this amount. Near the earth's poles of course some sensitivity will be lost. Even in areas of very high angle of dip it is believed that the compass of the present invention will have less error than hitherto known compasses. Thus, the compass does not need to be rebalanced to allow for varying dip and also a large volume chamber is not required to accommodate a tilting card, thus the compass may be reduced in volume and therefore the effects of volume variation of the fluid due to expansion is reduced. Also the low volume reduces the susceptibility of the compass to leaks.

It is a particular advantage of the construction that the compass can be read from the top, bottom and sides thus enabling for example, the same compass to be read from the top and the bottom by different persons such that these persons may obtain the same reading from a compass, particularly where communications such as engine control orders between those persons is required.

This facility enables the compass to be positioned away from possibly varying outside influences and to enable the compass to be read, for example, via a mirror system, and so reducing the susceptibility of the compass to erroneous readings.

Further advantages of the construction are that there is a minimum internal volume and therefore minimum expansion of the fluid. Thus expensive bellows or diaphragms are not necessary. Also there is a minimum of internal friction (i.e. liquid to internal surfaces) and minimum magnetic deviation with external movement. The compass may have a built in signal control for an accessory auto pilot and a built in coupling for grid bearing sights and other accessories.

Also the compass is less susceptible to swing during, in particular, aircraft turning and is also less affected by cargo changes on a ship or aircraft, because the centre of gravity remains in line with the pivot at all times.

Furthermore as the card has normally a top pivot, it does not matter if the lower body surfaces flex with expansion, whereas other compasses require a rigid support independent usually of the bellows or diaphragm to support the pivot or pivot bearing.

I claim:

1. A compass comprising:
   an enclosed chamber;
   a flat card, needle or the like positioned within said chamber;
   said chamber comprising a cylinder having upper and lower end walls;
   pivot suspension means, operably connected between said card, needle or the like and said upper end wall of said cylinder, for allowing said card, needle or the like to pivot within said cylinder about an axis perpendicular to said card, needle or the like;
   said chamber containing therein liquid means for floating said card, needle or the like within said cylinder and for causing said card, needle or the like to rise upwardly against said pivot suspension means;
   magnet mounting means engaged with and depending from said card, needle or the like within said chamber;
   a magnet supported by said magnet mounting means within said chamber in a manner such that in use said magnet is rotatable at least in a plane normal to the plane of said card, needle or the like, such rotation not causing any substantial movement of said card, needle or the like;
   said magnet mounting means and said magnet being free of any support from or connection to any walls of said chamber, whereby said card, needle or the like, said magnet mounting means and said magnet are supported within said chamber against said pivot suspension means solely by said liquid means;
   said upper and lower end walls of said cylinder being positioned and dimensioned such that in directions normal to the plane of said card, needle or the like there are small clearances between said card, needle or the like and said end walls, whereby said end walls form means for limiting any tilting movement of said card, needle or the like with respect to said axis; and
   said chamber further comprising an extension depending from the mid point of said cylinder, said magnet mounting means extending from said card, needle or the like into said extension, said magnet being pivotally affixed to said magnet mounting means, and the dimension of said extension being such that the diameter of said extension in a plane substantially parallel to the plane of said card, needle or the like is substantially less than the diameter of said cylinder in the plane of said card, needle or the like.

2. A compass as claimed in claim 1, wherein at least part of said extension comprises an expansion chamber.

3. A compass as claimed in claim 1, wherein said pivot suspension means comprises a pivot bearing positioned such that in use said pivot bearing is positioned above said card, needle or the like, and further comprising a float supporting said card, needle or the like within said cylinder, such that the tendency of said float to rise in said liquid means holds said float and said card, needle or the like against said pivot bearing.

4. A compass as claimed in claim 3, wherein said pivot bearing is mounted on a spring, said spring is mounted on said upper wall of said cylinder, and said float has associated therewith a substantially pointed member bearing on said pivot bearing.

5. A compass as claimed in claim 3, wherein the weight of said magnet and the buoyancy of said float are selected to minimize the pressure on said pivot bearing.

6. A compass as claimed in claim 1, further comprising pivots provided on the outer surface of said extension, and wherein the weight of the structure is selected so that the center of gravity is below, in use, said pivots.

7. A compass as claimed in claim 1, wherein said magnet comprises a ring-shaped member having opposite polarities at two opposite circumferential points thereof, said ring-shaped member pivoting about a horizontal axis which is a diameter of said ring-shaped member.

8. A compass as claimed in claim 1, wherein said magnet mounting means comprises at least one rod extending from the underside of said card, needle or the like, and pivot bearings between said magnet and said at least one rod.

* * * * *